(12) United States Patent
Xiong et al.

(10) Patent No.: US 10,821,605 B2
(45) Date of Patent: Nov. 3, 2020

(54) ROBOT MOTION PATH PLANNING METHOD, APPARATUS AND TERMINAL DEVICE

(71) Applicant: UBTECH Robotics Corp, Shenzhen (CN)

(72) Inventors: Youjun Xiong, Shenzhen (CN); Jinghua Tang, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 294 days.

(21) Appl. No.: 16/026,032

(22) Filed: Jul. 2, 2018

(65) Prior Publication Data

US 2019/0202056 A1 Jul. 4, 2019

(30) Foreign Application Priority Data

Dec. 28, 2017 (CN) .......................... 2017 1 1462962

(51) Int. Cl.
*B25J 9/16* (2006.01)

(52) U.S. Cl.
CPC ... *B25J 9/1666* (2013.01); *G05B 2219/40443* (2013.01); *G05B 2219/40476* (2013.01); *G05B 2219/40477* (2013.01); *G05B 2219/40519* (2013.01)

(58) Field of Classification Search
CPC .................. B25J 9/1666; B25J 9/1664; G05B 2219/40443; G05B 2219/40477; G05B 2219/40519; G05B 2219/40521; G05B 2219/40523; G05B 2219/40476; G05B 2219/40431; G05D 1/0212; G05D 1/0214; G05D 1/0217; G05D 1/0221; G06Q 10/047

See application file for complete search history.

(56) References Cited

U.S. PATENT DOCUMENTS

2010/0121517 A1* 5/2010 Lee ...................... G05D 1/0274
701/25

* cited by examiner

*Primary Examiner* — Spencer D Patton (57) ABSTRACT

The present disclosure provides a robot motion path planning method, apparatus, and terminal device. The method includes planning a planned path for a robot in a current scene using an open motion planning library (OMPL) database, setting a shortest ideal path as an initial ideal path, calculating a new path between the planned path and the initial ideal path using a dichotomy method, determining whether the new path meets an obstacle avoidance requirement and a structural constraint of the robot in the current scene, making the new path as the new planned path if yes, otherwise determining the new path as a new ideal path, optimizing the planned path using the dichotomy method iteratively until an error between the planned path and the ideal path is within a preset range, and determining the planned path as a motion path of the robot, thereby improving the motion efficiency.

11 Claims, 7 Drawing Sheets

ROBOT MOTION PATH PLANNING METHOD, APPARATUS AND TERMINAL DEVICE

CROSS REFERENCE TO RELATED APPLICATIONS

This application claims priority to Chinese Patent Application No. 201711462962.9, filed Dec. 28, 2017, which is hereby incorporated by reference herein as if set forth in its entirety.

BACKGROUND

1. Technical Field

The present disclosure relates to robot technology, and particularly to a robot motion path planning method, apparatus and terminal device.

2. Description of Related Art

With the increasing demand for robotic applications, users are no longer satisfied with point-to-point operations of robots in simple scenes. Instead, robots are expected to perform complex operations in more complex scenarios.

The software MoveIt is currently the most advanced and widely used open-source robot motion planning software, which mainly calls a flexible collision library (FCL) to implement an obstacle collision detection, and calls an open motion planning library (OMPL) database to solve motion planning problems. The motion planning solvers provided by the OMPL database all adopt random sampling methods. Although these methods are complete in probability, when the environment is complex, the calculation results obtained within a limited time have great uncertainty and are easy to cause low motion efficiency of robots.

BRIEF DESCRIPTION OF DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

The embodiments of the present disclosure provide a robot motion path planning method, apparatus, and terminal device, which are used to solve the problem that the paths planned through an open motion planning library (OMPL) database have great uncertainty and may easily cause low motion efficiency of a robot.

In order to make the object, features, and advantages of the present disclosure more apparent and easy to understand, in the following descriptions, the technical solutions m the embodiments of the present disclosure will be described clearly and completely with reference to the drawings in the embodiments of the present disclosure. Apparently, the described embodiments are some but not all of the embodiments of the present disclosure. All other embodiments obtained by those skilled in the art based on the embodiments of the present disclosure without creative efforts shall fall within the protection scope of the present disclosure.

It will be understood that, when used in this specification and the appended claims, the term "obstacle avoidance requirement" indicates a condition for a robot to avoid obstacles. For example, a probability for the robot to successively avoid obstacles. In this embodiment, the condition for the robot to avoid obstacles may be obtained through, for example, a sensor such as an infrared sensor, a laser sensor, an ultrasound sensor, a camera such as a binocular camera, an RGBD camera, or a visual module.

It will be understood that, when used in this specification and the appended claims, the term "structural constraint" indicates a limitation of a robot's structure which limits the movement of the robot. For example, for each joint of the arm of the robot, there is as structural constraint such as allowable rotation angle which limits the movement of joint.

Figure 1:
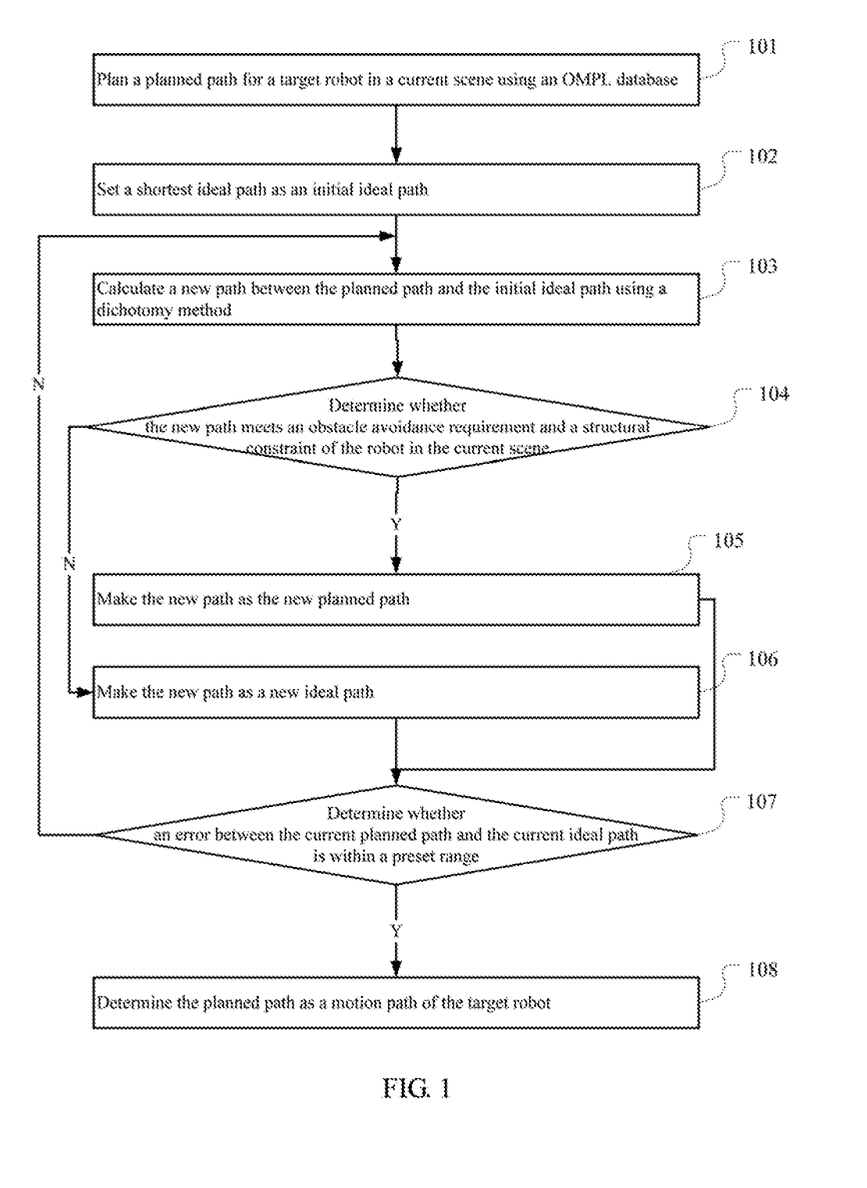
FIG. 1 is a flow chart of a robot motion path planning method according to an embodiment of the present disclosure.

FIG. 1 is a flow chart of a robot motion path planning method according to an embodiment of the present disclosure. In this embodiment, the method is a computer-implemented method executable for a processor. The method can be applied to a robot, where the robot can be equipped with sensors, such as infrared sensors, ultrasound sensors, or laser sensors. As shown in FIG. 1, the method includes the following steps.

In step 101, planning a planned path for a target robot in a current scene using an open motion planning library (OMPL) database, where the planned path includes a plurality of points, and the plurality of points include a start point and an end point.

Figure 2:
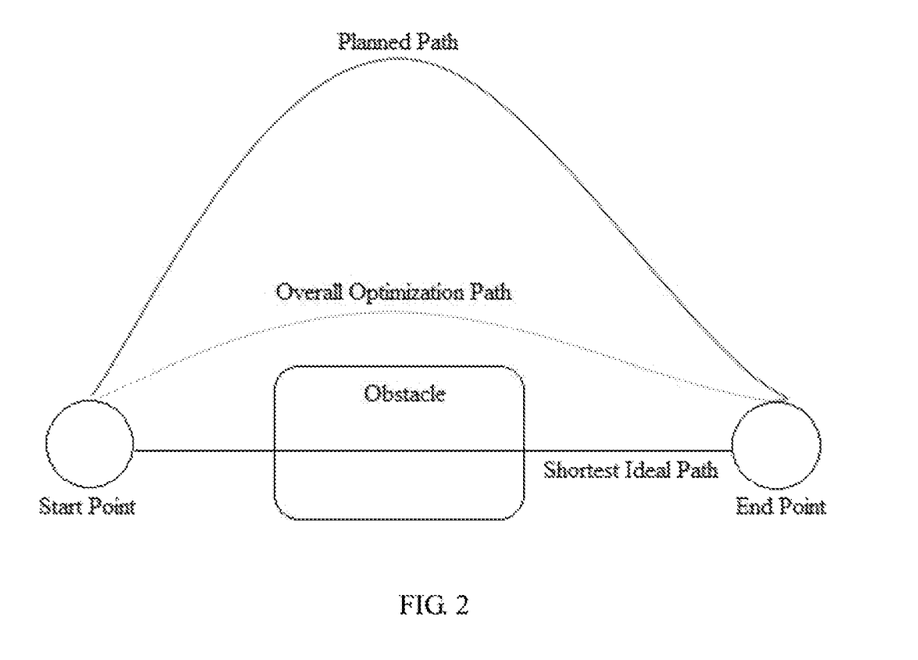
FIG. 2 is a schematic diagram of optimizing using a dichotomy method in an application scenario of the robot motion path planning method according to an embodiment of the present disclosure.

In this embodiment, the OMPL database is used to calculate the planned path in the current scene firstly. FIG. 2 is a schematic diagram of optimizing using a dichotomy method in an application scenario of the robot motion path planning method according to an embodiment of the present disclosure. It is assumed that there has a total of a points on the planned path, a joint angle vector at the start point is denoted as $q_{start}$, and a joint angle vector at the end point is denoted as $q_{goal}$, the planned path can be presented as $Q_{plan}=[q_1 \ q_2 \ \ldots \ q_n]$ such as the "planned path" shown in FIG. 2, where $q_1=q_{start}$, $q_n=q_{goal}$.

It should be noted that the robot motion path planning method in this embodiment may be specifically applied to the path planning of the overall motion of the robot, and may also be applied to the path planning of the motion of the components of the robot such as the path planning of the arm of the robot.

In step 102, setting a shortest ideal path as an initial ideal path, where the shortest ideal path is a shortest path between the start point and the end point.

Referring to FIG. 2, it is apparent that a connection between the start point and the end point is the shortest motion path and the shortest ideal path of the robot, which is determined as the initial ideal path and denoted as $Q_{ideal}=[\bar{q}_1\ \bar{q}_2\ \ldots\ \bar{q}_n]$ such as the "shortest ideal path" described in FIG. 2.

In step 103, calculating a new path between the planned path and the initial ideal path using a dichotomy method.

It can be understood that, in order to improve the motion efficiency of the target robot, referring to FIG. 2, the "planned path" should be as close as possible to the "shortest ideal path" on the premise of guaranteeing that the path avoids obstacles and meets joint limit requirements. In this embodiment, the dichotomy method is used to optimize the planned path. Specifically, the new path $$Q_{new} = \frac{Q_{plan} + Q_{ideal}}{2},$$

that is, a compromise path between the planned path and the ideal path is computed and used as the current new path.

In step 104, determining whether the new path meets an obstacle avoidance requirement and a structural constraint of the robot in the current scene; if yes, step 105 is executed; otherwise, step 106 is executed;

In step 105, making the new path as the new planned path.

In step 106, making the new path as a new ideal path.

For the above-mentioned steps 104-106, it can be seen from the content that after the new path is calculated, it is further required to distinguish whether the calculated new path meets the obstacle avoidance requirement and the structural constraint of the robot so as to meet the motion (movement) requirement of the robot so that the robot can move successfully. The above-mentioned structural constraint is determined by the actual condition of the robot, which is not specifically limited in this embodiment.

For ease of understanding, if any path meets the obstacle avoidance requirement and the structural constraint, the path is considered to be valid and denoted as $Q \in S_{valid}$; if any point of the path meets the obstacle avoidance requirement and the structural constraint, the point is considered to be valid and denoted as $q \in S_{valid}$. Referring to FIG. 2, if there is an obstacle, $Q_{plan} \in S_{valid}$ and $Q_{ideal} \notin S_{valid}$.

Therefore, the above-mentioned step 104 is: determining whether $Q_{new} \in S_{valid}$, and executing step S105 to set the new path as the new planned path in response to $Q_{new} \in S_{valid}$, that is, let $Q_{plan} = Q_{new}$; otherwise, if $Q_{new} \notin S_{valid}$, step 106 is executed, and where $Q_{ideal} = Q_{new}$.

It can be seen that each execution of the above-mentioned steps 103-106 lets the planned path further approximating the shortest ideal path, that is, achieving a further optimizing.

In step 107, determine whether an error between the planned path and the ideal path is within a preset range; if yes, step 108 is executed; otherwise, return to step 103.

The optimization idea in this embodiment is that the above-mentioned steps 103-106 are executed in multiple iterations, so that the planned path infinitely approaches the shortest ideal path on the premise of meeting the obstacle avoidance requirement and the structural constraint, thereby finding a high efficiency motion path for the target robot in an overall manner. However, in order to guarantee the optimization efficiency, jump-out condition(s) of the above-mentioned iterative optimization process need to be set, so that the error between the planned path and the current ideal path meets a certain condition, and then the planned path can be considered to be sufficiently efficient.

Therefore, step 107 determines whether the error between the planned path and the current ideal path is within a preset range. If not, it still needs to continue iterative optimization and returns to step 103 to perform the next dichotomy optimization; if yes, it is considered that the planned path is already an overall optimization trajectory after scale and denoted as. Compared with the initial planned path, it is clear that the scaled path is shorter, as the "overall optimization path" shown in FIG. 2.

Furthermore, the above-mentioned step 107 specifically includes: calculating a shortest distance between each point of the planned path and the current ideal path first; determining the error between the planned path and the ideal path being within the preset range, in response to a maximum value of the calculated shortest distance corresponding to each point being smaller than a preset distance threshold.

In step 108, determining the planned path as a motion path of the target robot.

The motion path may be output to the target robot for moving the target robot based on the motion path. It can be understood that the planned path optimized by the dichotomy method has been greatly improved in the motion efficiency, in comparison with the original planned path. Therefore, at this time, the planned path can be determined as the motion path of the target robot.

Figure 3:
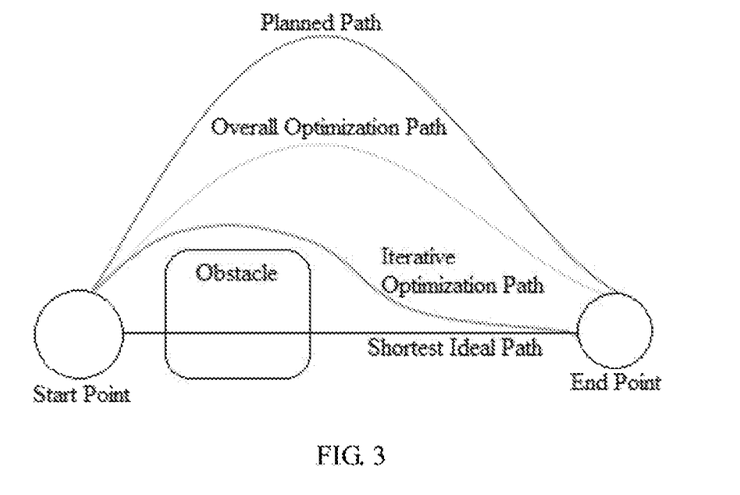
FIG. 3 is a schematic diagram of using a single-point iterative optimization in an application scenario of the robot motion path planning method according to an embodiment of the present disclosure.

As shown in FIG. 2, if the obstacle is at a position near to the middle of the path, the planned path can basically obtain a relatively ideal result after being optimized by the above-mentioned dichotomy method. FIG. 3 is a schematic diagram of using a single-point iterative optimization in an application scenario of the robot motion path planning method according to an embodiment of the present disclosure. However, when the obstacle is close to the start point or the end point of the path, although the path optimized by the dichotomy optimization improves the motion efficiency of the robot, it may not achieve the ideal effect, as the "overall optimization path" shown in FIG. 3. Therefore, for the case similar to the obstacle in FIG. 3, further optimization referred to as single-point iterative optimization in this embodiment may further performed. The specific optimization process is described as follows.

Figure 4:
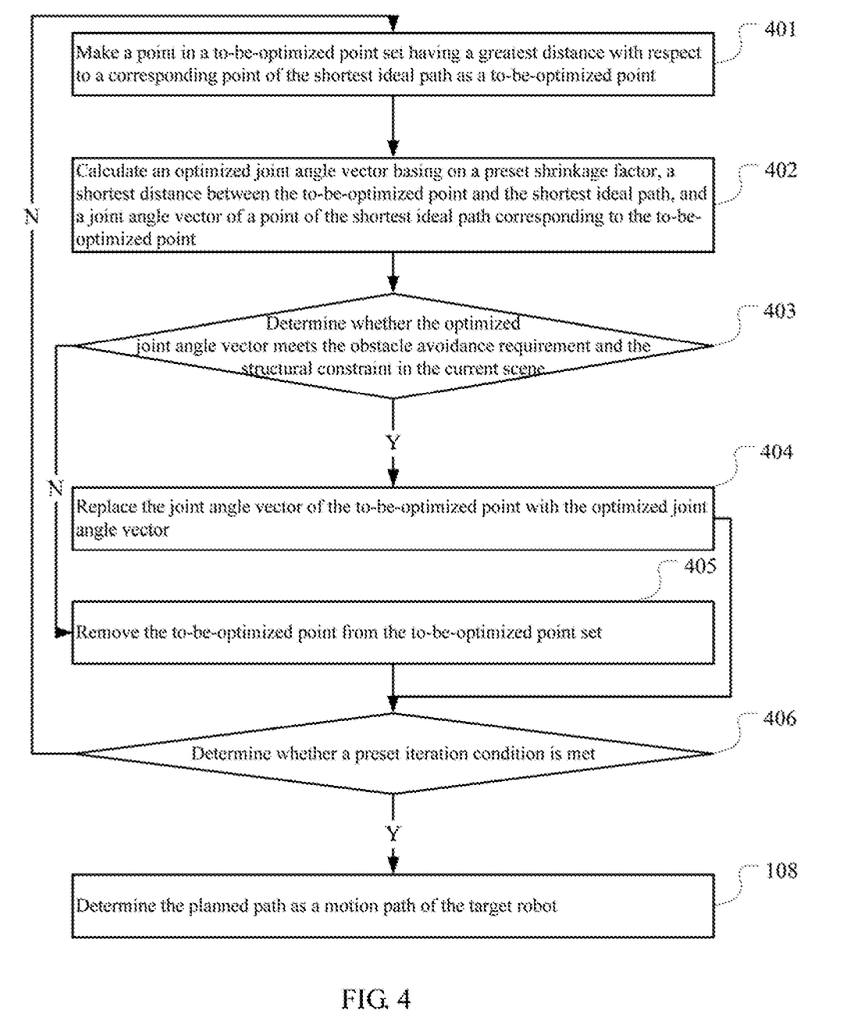
FIG. 4 is a now chart of performing a single-point iterative optimization in an application scenario of the robot motion path planning method according to an embodiment of the present disclosure.

FIG. 4 is a flow chart of performing a single-point iterative optimization in an application scenario of the robot motion path planning method according to an embodiment of the present disclosure. Furthermore, as shown in FIG. 4, before step 108, the method further includes:

In step 401, making a point in a to-be-optimized point set having a greatest distance with respect to a corresponding point of the shortest ideal path as a to-be-optimized point, where the to-be-optimized point set includes other points except the start point and the end point of the planned path;

In step 402, calculating an optimized joint angle vector basing on a preset scale factor, a shortest distance between the to-be-optimized point and the shortest ideal path, and a joint angle vector of a point of the shortest ideal path corresponding to the to-be-optimized point;

In step 403, determine whether the optimized joint angle vector meets the obstacle avoidance requirement and the structural constraint of the robot in the current scene; if yes, step 404 is executed; otherwise, step 405 is executed.

In step 404, replacing the joint angle vector of the to-be-optimized point with the optimized joint angle vector;

In step 405, removing the to-be-optimized point from the to-be-optimized point set; and In step 406, determining whether a preset iteration condition is met; if yes, step 108 is executed; otherwise, return to step 401.

For step 401, the to-be-optimized point set may be denoted as $q_l$, where the subscript is $l=2, 3, \ldots, n-1$, and the start point and the ending point of the path are excluded. The shortest distance of each point in the to-be-optimized point set from the shortest ideal path (that is, the initial ideal path such as the "shortest ideal path" in FIG. 3) is denoted as $d_i=q_{opt1}-q_{ideal}$ ($i \in l$), where $q_{opt1}$ a point on $Q_{opt1}$ which had optimized by the dichotomy method, $q_{ideal}$ is a point on the "shortest ideal path". In addition, the subscript of the point in the to-be-optimized point set which has the greatest distance can be denoted as $i_{max}=i_{max(d_i)}$.

The above-mentioned step 402 may specifically include: calculating the optimized joint angle vector by substituting the preset scale factor, the shortest distance between the to-be-optimized point and the shortest ideal path, and the joint angle vector of the point of the shortest ideal path corresponding to the to-be-optimized point into a first formula:

$$q_{opt2,i_{max}} = q_{ideal,i_{max}} + wd_{i_{max}};$$

where, $i_{max}$ is the subscript of the to-be-optimized point, $d_{i_{max}}$ is the shortest distance between the to-be-optimized point and the shortest ideal path, $q_{ideal,i_{max}}$ is the joint angle vector of the point on the shortest ideal path which corresponding to the to-be-optimized point w is the scale factor, w>1, and $q_{opt2,i_{max}}$ is the optimized joint angle vector.

For steps 403-405, it can be understood that whenever the single-point optimization is performed to one point, it is further required to determine whether the optimized point meets the obstacle avoidance requirement and the structural constraint of the robot in the current scene, that is, meets the motion requirement of the target robot. It can be seen that if the optimized joint angle vector meets the obstacle avoidance requirement and the structural constraint of the robot in the current scene, that is, $q_{opt1,i_{max}} \in S_{valid}$, the joint angle vector of the corresponding point on $Q_{opt1}$ can be replaced with the optimized joint angle vector, that is, $q_{opt1,i_{max}} = q_{opt2,i_{max}}$. If the optimized joint angle vector does not meet the obstacle avoidance requirement and the structural constraint of the robot in the current scene, that is, $q_{opt1,i_{max}} \notin S_{valid}$, the point $i_{max}$ is removed from the to-be-optimized point set.

Figure 5:
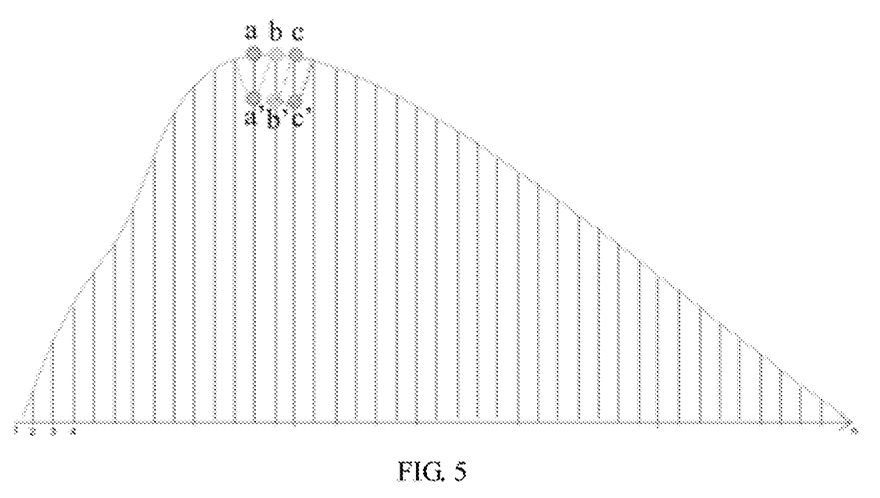
FIG. 5 is a schematic diagram of an optimization effect of the single-point iterative optimization according to an embodiment of the present disclosure.

It can be seen that the above-mentioned steps 401-405 are a single point optimization process for one point. FIG. 5 is a schematic diagram of an optimization effect of the single-point iterative optimization according to an embodiment of the present disclosure. As shown in FIG. 5, point a to point a' is the effect of the first single point optimization, point b to point b' is the effect of the second single point optimization, and point c to point c' is the effect of the third single point optimization It can be understood that, in order to optimize the entire planned path, it is necessary to perform the single point optimization on multiple paints the planned path so as to obtain more ideal results. The in this embodiment, it further needs to iteratively execute the above-mentioned steps 401-405 and set the jump-out condition of the single-point iterative optimization, that is, the above-mentioned step 406.

For step 406, for the effects of the single-point iterative optimization, the iteration condition can be preset in two ways. First, a maximum iteration number can be set, and the iterative optimization is stopped when the number of iterations reaches the number. Specifically, "determining the preset iteration condition being met, in response to a iteration number of returning to the making the point in the to-be-optimized point set having the greatest distance with respect to the corresponding point of the shortest ideal path as the to-be-optimized point being larger than a preset iteration number threshold". Second, a determination can be made according to the iterative effect, and the single point iterative optimization is continued until the joint angles of all the points can no longer be shrunk. The specific execution step can be "determining the preset iteration condition being met, in response to all of the points in the to-be-optimized point set having been removed".

It can be understood that the specific iteration condition can be set according to actual conditions, which is not specifically limited herein. When the preset iteration condition is not met, it is necessary to continue the single-point iterative optimization and return to step 401 to execute the next iterative process; when the preset iteration condition is met, it can be considered that the single-point iterative optimization to the planned path has been completed, and step 108 is executed to output the planned path as the motion path of the target robot.

As shown in FIG. 3, after a number of the single-point iterative optimizations, even if the obstacle is closer to the star point or the end point of the path, the optimized planned path may obtain a relatively ideal result, as the "iterative optimization path" shown in FIG. 3 which is a planned path after the single-point iterative optimization.

The robot motion path planning method provided in this embodiment is based on the currently open-source OMPL database algorithm and adopts the dichotomy method and the single-point iteration method, which can plan a reasonable and efficient obstacle avoidance path for any position where the obstacle is located, hence the disadvantages of the original OMPL database algorithm that the planned path is not ideal and inefficient can be overcome. The method can be effectively applied to tasks such as the object grabbing and cargo sorting of a mechanical arm, which improves the operation efficiency of the grabbing and sorting, and also guarantees the safety (obstacle avoidance) of the operation, and has a wide range of use in logistics and household service industries.

It should be understood that, in the above-mentioned embodiment, the magnitude of the sequence number of each step does not mean the execution order, and the execution order of each process should be determined by its function and internal logic, and should not constitute any limitation on the implementation process of this embodiment.

The above mainly describes a robot motion path planning method, and a robot motion path planning apparatus will be described in detail below.

Figure 6:
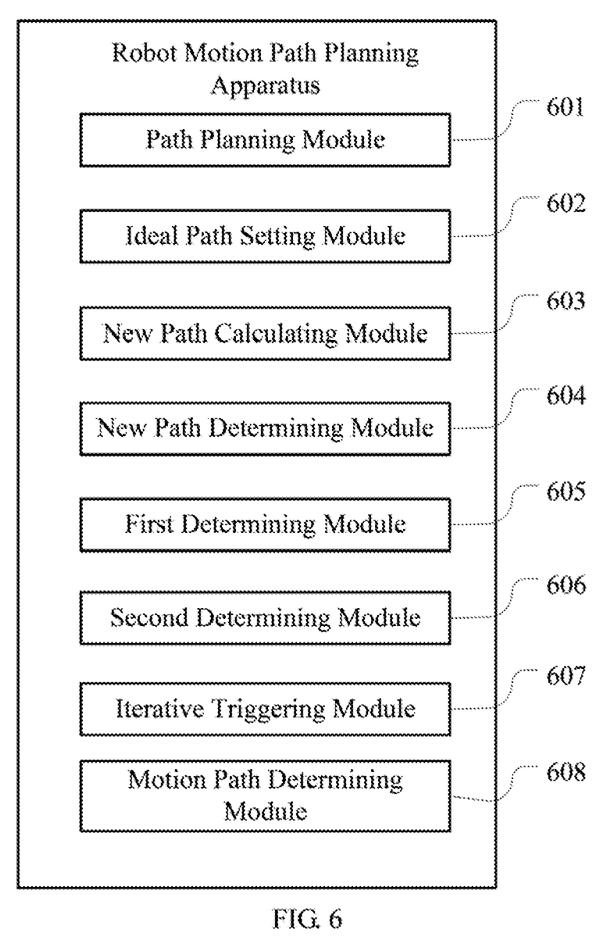
FIG. 6 is a schematic diagram of a robot motion path planning apparatus according to an embodiment of the present disclosure.

FIG. 6 is a schematic diagram of a robot motion path planning apparatus according to an embodiment of the present disclosure.

In this embodiment, a robot motion path planning apparatus includes:

a path planning module 601 configured to plan a planned path for a target robot in a current scene using an open motion planning library (OMPL) database, where the planned path includes a plurality of points, and the plurality of points include a start point and an end point;

an ideal path setting module 602 configured to set a shortest ideal path as an initial ideal path, where the shortest ideal path is a shortest path between the start point and the end point;

a new path calculating module 603 configured to calculate a new path between the planned path and the initial ideal path using a dichotomy method;

a new path determining module 604 configured to determine whether the new path meets an obstacle avoidance requirement and a structural constraint of the robot in the current scene;

a first determining module 605 configured to determine the new path as the new planned path, in response to a determination result of the new path determining module is yes;

a second determining module 606 configured to determine the new path as a new ideal path, in response to the determination result of the new path determining module is no;

an iterative triggering module 607 configured to trigger the new path calculating module, until an error between the planned path and the ideal path is within a preset range; and a motion path determining module 608 determining the planned path as a motion path of the target robot.

Furthermore, the robot motion path planning apparatus may further include:

a to-be-optimized point determining module configured to make a point in a to-be-optimized point set having a greatest distance with respect to a corresponding point of the shortest ideal path as a to-be-optimized point, where the to-be-optimized point set includes other points except the start point and the end point of the planned path;

an optimization vector calculating module configured to calculate an optimized joint angle vector basing on a preset scale factor, a shortest distance between the to-be-optimized point and the shortest ideal path, and a joint angle vector of a point of the shortest ideal path corresponding to the to-be-optimized point;

a vector determining module configured to determine whether the optimized joint angle vector meets the obstacle avoidance requirement and the structural constraint of the robot in the current scene;

a sector replacing module configured to replace the joint angle vector of the to-be-optimized point with the optimized joint angle vector, in response to a determination result of the vector determining an module is yes;

a point removing module configured to remove the to-be-optimized point from the to-be-optimized point set, in response to the determination result of the vector determining module is no; and an iterative optimization module configured to trigger the to-be-optimized point determining module, until a preset iteration condition is met.

Furthermore, the iterative optimization module may include:

a first meeting determining unit configured to determine the preset iteration condition being met, in response to a iteration number of returning to the making the point in the to-be-optimized point set having the greatest distance with respect to the corresponding point of the shortest ideal path as the to-be-optimized point being larger than a preset iteration number threshold; or a second meeting determining unit configured to determine the preset iteration condition being met, in response to all of the points in the to-be-optimized point set having been removed.

Furthermore, the optimization vector calculating module may include:

an angle vector calculating unit configured to calculate the optimized joint angle vector by substituting the preset scale factor, the shortest distance between the to-be-optimized point and the shortest ideal path, and the joint angle vector of the point of the shortest ideal path corresponding to the to-be-optimized point into a first formula:

$$q_{opt2,i_{max}} = q_{ideal,i_{max}} + wd_{i_{max}};$$

where, $i_{max}$ is the subscript of the to-be-optimized point, $d_{i_{max}}$ is the shortest distance between the to-be-optimized point and the shortest ideal path, $q_{ideal,i_{max}}$ is the joint angle vector of the point on the shortest ideal path which corresponding to the to-be-optimized point, w is the scale factor, w<1, and $q_{opt2,i_{max}}$ is the optimized joint angle vector.

Furthermore, the robot motion path planning apparatus may further include:

a shortest path calculating module configured to calculate a shortest distance between each point of the planned path and the current ideal path; and a third determining module is configured to determine the error between the planned path and the ideal path being within the preset range, in response to a maximum value of the calculated shortest distance corresponding to each point being smaller than a preset distance threshold.

Figure 7:
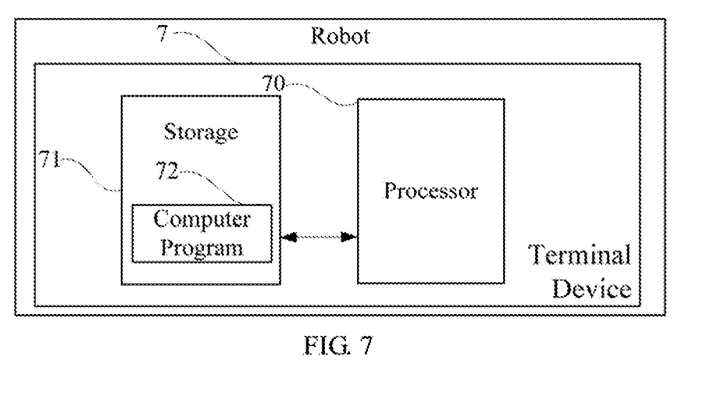
FIG. 7 is a schematic diagram of a terminal device according to an embodiment of the present disclosure.

FIG. 7 is a schematic diagram of a terminal device according to an embodiment of the present disclosure. As shown in FIG. 7, in this embodiment, a terminal device 7 includes a processor 70, a storage 71, and a computer program 72 stored in the storage 71 (e.g., a memory), and executable on the processor 70, for example, a program executing the above-mentioned robot motion path planning method. The steps in the above-mentioned embodiments of the robot motion path planning method are implemented when the processor 70 executes the computer program 72, for example, steps 101-108 shown in FIG. 1. Alternatively, the functions of each module unit in the above-mentioned device embodiments are realized when the processor 70 executes the computer program 72, for example, the functions of the modules 601-608 shown in FIG. 6.

Exemplarily, the computer program 72 may be divided into one or more modules/units, and the one or more modules/units are stored in the storage 71 and executed by the processor 70 to realize the present disclosure. The one or more modules/units may be a series of computer program instruction segments capable of performing specific function(s), where the instruction segments are used to describe the execution process of the computer program 72 in the terminal device 7.

The terminal device 7 may be a computing device such as a desktop computer, a notebook computer, a tablet computer, and a cloud server. The terminal device 7 may include, but is not limited to, the processor 70 and the storage 71. It can be understood by those skilled in the art that FIG. 7 is merely an example of the terminal device 7 and does not constitute a limitation on the terminal device 7, and may include more or fewer components than those shown in the figure, or a combination of some components or different components. For example, the terminal device 7 may further include an input/output device, a network access device, a bus, and the like.

The processor 70 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 71 may be an internal storage unit of the terminal device 7, for example, a hard disk or a memory of the terminal device 7. The storage 71 may also be an external storage device of the terminal device 7, for example, a plug-in hard disk, a smart media card (SMC), a secure digital (SD) card, flash card, and the like, which is equipped on terminal 7. Furthermore, the storage 71 may further include both an internal storage unit and an external storage device, of the terminal device 7. The storage 71 is configured to store the computer program and other programs and data required by the terminal device 7. The storage 71 may also be used to temporarily store data that has been or will be output.

Those skilled in the art can clearly understand that, for convenience and brevity of description, the specific working processes of the above-mentioned apparatus/device, and unit may refer to the corresponding processes in the above-mentioned method embodiment, and details are not described herein again.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative module, units and/or steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus/device and method may be implemented in other manners. For example, the above-mentioned apparatus embodiment is merely exemplary. For example, the division of units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, apparatuses/devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated unit is implemented in the form of a software functional unit and is sold or used as an independent product, the integrated module unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced. While these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented robot motion path planning method, comprising executing on a processor steps of:
    planning a planned path for a robot in a current scene using an open motion planning library (OMPL) database, wherein the planned path comprises a plurality of points, the plurality of points comprising a start point and an end point;
    setting a shortest ideal path as an initial ideal path, wherein the shortest ideal path is a shortest path between the start point and the end point;
    calculating a new path between the planned path and the initial ideal path using a dichotomy method;
    determining whether the new path meets an obstacle avoidance requirement and a structural constraint of the robot in the current scene;
    making the new path as the new planned path, in response to the new path meeting the obstacle avoidance requirement and the structural constraint;
    making the new path as a new ideal path, in response to the new path not meeting the obstacle avoidance requirement or the structural constraint;
    returning to the calculating the new path between the planned path and the ideal path using the dichotomy method, until an error between the planned path and the ideal path is within a preset range; and
    determining the planned path as a motion path of the robot.

2. The method of claim 1, wherein before the determining the current planned path as the motion path of the robot executing, on the processor, the further steps of:
   making a point in a to-be-optimized point set having a greatest distance with respect to a corresponding point of the shortest ideal path as a to-be-optimized point, wherein the to-be-optimized point set comprises other points of the planned path other than the start point and the end point;
   calculating an optimized joint angle vector of joints of the robot based on a preset scale factor, a shortest distance between the to-be-optimized point and the shortest ideal path, and a joint angle vector of the joints of the robot at a point of the shortest ideal path corresponding to the to-be-optimized point;
   determine whether the optimized joint angle vector meets the obstacle avoidance requirement and the structural constraint in the current scene;
   replacing the joint angle vector of the to-be-optimized point with the optimized joint angle vector, in response to the optimized joint angle vector meeting the obstacle avoidance requirement and the structural constraint in the current scene;
   removing the to-be-optimized point from the to-be-optimized point set, in response to the optimized joint angle vector not meeting the obstacle avoidance requirement and the structural constraint in the current scene; and
   returning to the making the point in the to-be-optimized point set having the greatest distance with respect to the corresponding point of the shortest ideal path as the to-be-optimized point, until a preset iteration condition is met.

3. The method of claim 2, wherein the preset iteration condition is met comprises one of:
   determining the preset iteration condition being met, in response to an iteration number of returning to the making the point in the to-be-optimized point set having the greatest distance with respect to the corresponding point of the shortest ideal path as the to-be-optimized point being larger than a preset iteration number threshold; and
   determining the preset iteration condition being met, in response to all of the points in the to-be-optimized point set having been removed.

4. The method of claim 2, wherein the calculating the optimized joint angle vector based on the preset scale factor, the shortest distance between the to-be-optimized point and the shortest ideal path, and the joint angle vector of the point of the shortest ideal path corresponding to the to-be-optimized point comprises:
   calculating the optimized joint angle vector by substituting the preset scale factor, the shortest distance between the to-be-optimized point and the shortest ideal path, and the joint angle vector of the point of the shortest ideal path corresponding to the to-be-optimized point into a first formula:

$$q_{opt2,i_{max}} = q_{ideal,i_{max}} + wd_{i_{max}};$$

wherein, $i_{max}$ is the subscript of the to-be-optimized point, $d_{i_{max}}$ is the shortest distance between the to-be-optimized point and the shortest ideal path, $q_{ideal,i_{max}}$ is the joint angle vector of the point on the shortest ideal path and corresponds to the to-be-optimized point, w is the scale factor, w<1, and $q_{opt2,i_{max}}$ is the optimized joint angle vector.

5. The method of claim 1, wherein before the returning to the calculating the new path between the planned path and the ideal path using the dichotomy method executing, on the processor, the further steps of:
   calculating a shortest distance between each point of the planned path and the current ideal path; and
   determining the error between the planned path and the ideal path being within the preset range, in response to a maximum value of the calculated shortest distance corresponding to each point being smaller than a preset distance threshold.

6. The method of claim 1, further comprising executing on the processor steps of:
   outputting the motion path to the robot for moving the robot based on the motion path.

7. A terminal device, comprising:
   one or more processors;
   a memory; and
   one or more programs, wherein the one or more programs are stored in the memory and configured to be executed by the one or more processors, the one or more programs comprise:
   instructions for planning a planned path for a robot in a current scene using an open motion planning library (OMPL) database, wherein the planned path comprises a plurality of points, the plurality of points comprising a start point and an end point;
   instructions for setting a shortest ideal path as an initial ideal path, wherein the shortest ideal path is a shortest path between the start point and the end point;
   instructions for calculating a new path between the planned path and the initial ideal path using a dichotomy method;
   instructions for determining whether the new path meets an obstacle avoidance requirement and a structural constraint of the robot in the current scene;
   instructions for making the new path as the new planned path, in response to the new path meeting the obstacle avoidance requirement and the structural constraint;
   instructions for making the new path as a new ideal path, in response to the new path not meeting the obstacle avoidance requirement or the structural constraint;
   instructions for returning to the calculating the new path between the planned path and the ideal path using the dichotomy method, until an error between the planned path and the ideal path is within a preset range; and
   instructions for determining the planned path as a motion path of the robot.

8. The terminal device of claim 7, wherein the one or more programs further comprise:
   instructions for making a point in a to-be-optimized point set having a greatest distance with respect to a corresponding point of the shortest ideal path as a to-be-optimized point, wherein the to-be-optimized point set comprises points of the planned path other than the start point and the end point;
   instructions for calculating an optimized joint angle vector basing of joints of the robot based on a preset scale factor, a shortest distance between the to-be-optimized point and the shortest ideal path, and a joint angle vector of the joints of the robot at a point of the shortest ideal path corresponding to the to-be-optimized point;
   instructions for determine whether the optimized joint angle vector meets the obstacle avoidance requirement and the structural constraint in the current scene;
   instructions for replacing the joint angle vector of the to-be-optimized point with the optimized joint angle vector, in response to the optimized joint angle vector meeting the obstacle avoidance requirement and the structural constraint in the current scene;

instructions for removing the to-be-optimized point from the to-be-optimized point set, in response to the optimized joint angle vector not meeting the obstacle avoidance requirement and the structural constraint in the current scene; and instructions for returning to the making the point in the to-be-optimized point set having the greatest distance with respect to the corresponding point of the shortest ideal path as the to-be-optimized point, until a preset iteration condition is met.

9. The terminal device of claim 8, wherein the instructions for returning to the making the point in the to-be-optimized point set having the greatest distance with respect to the corresponding point of the shortest ideal path as the to-be-optimized point, until a preset iteration condition is met comprise one of:

instructions for determining the preset iteration condition being met, in response to an iteration number of returning to the making the point in the to-be-optimized point set having the greatest distance with respect to the corresponding point of the shortest ideal path as the to-be-optimized point being larger than a preset iteration number threshold; and instructions for determining the preset iteration condition being met, in response to all of the points in the to-be-optimized point set having been removed.

10. The terminal device of claim 8, wherein the instructions for calculating an optimized joint angle vector based on a preset scale factor, a shortest distance between the to-be-optimized point and the shortest ideal path, and a joint angle vector of a point of the shortest ideal path corresponding to the to-be-optimized point comprise:

instructions for calculating the optimized joint angle vector by substituting the preset scale factor, the shortest distance between the to-be-optimized point and the shortest ideal path, and the joint angle vector of the point of the shortest ideal path corresponding to the to-be-optimized point into a first formula:

$$q_{opt2,i_{max}} = q_{ideal,i_{max}} + w d_{i_{max}};$$

wherein, $i_{max}$ is the subscript of the to-be-optimized point, $d_{i_{max}}$ is the shortest distance between the to-be-optimized point and the shortest ideal path, $q_{ideal,i_{max}}$ is the joint angle vector of the point on the shortest ideal path and corresponds to the to-be-optimized point, w is the scale factor, w<1, and $q_{opt2,i_{max}}$ is the optimized joint angle vector.

11. The terminal device of claim 7, wherein the one or more programs further comprise:

instructions for calculating a shortest distance between each point of the planned path and the current ideal path; and instructions for determining the error between the planned path and the ideal path being within the preset range, in response to a maximum value of the calculated shortest distance corresponding to each point being smaller than a preset distance threshold.

* * * * *